United States Patent [19]
Johns

[11] 3,840,273
[45] Oct. 8, 1974

[54] DUAL WHEEL MOUNTING ASSEMBLY

[76] Inventor: Reed L. Johns, 6733 South 2345 East, Salt Lake City, Utah 84121

[22] Filed: Aug. 24, 1973

[21] Appl. No.: 391,384

Related U.S. Application Data

[63] Continuation-in-part of Ser. No. 241,616, April 6, 1972, Pat. No. 3,790,218.

[52] U.S. Cl. ............................ 301/36 R, 301/9 DN
[51] Int. Cl. ............................................. B60b 11/02
[58] Field of Search ...... 301/36 R, 9 DN, 9 AN, 65, 301/38, 47

[56] References Cited
UNITED STATES PATENTS
2,635,012  4/1953  Rappaport ......................... 301/36 R
3,039,825  6/1962  Clark ................................. 301/36 R Primary Examiner—M. Henson Wood, Jr.
Assistant Examiner—Reinhard J. Eisenzopf
Attorney, Agent, or Firm—Lynn G. Foster

[57] ABSTRACT

An assembly for mounting dual wheels, said assembly comprising a generally cylindrical member with outwardly radially projecting flanged portions at each end thereof, a plurality of apertures extending through the flanged portion at the inner end of said cylindrical member and positioned to receive the wheel mounting studs of a vehicle hub, and a plurality of externally threaded shafts projecting outwardly from the outer flanged portion at the opposite end of said cylindrical member extending parallel to the axis of said cylindrical member and positioned to mate with the mounting apertures of a vehicle wheel. Radially projecting arms are diagonally adjustable by a plate-bolt assembly associated with the outer flange such that the arms when secured transfer at least some of the load from the outer hub of the dual wheels to the rim of the inner wheel.

5 Claims, 4 Drawing Figures

DUAL WHEEL MOUNTING ASSEMBLY

BACKGROUND

Continuity

This application is a continuation-in-part of my co-pending U.S. Pat. application Ser. No. 241,616, filed Apr. 6, 1972, now U.S. Pat. No. 3,790,218.

FIELD OF INVENTION

This invention relates to automotive vehicles and is particularly directed to apparatus for mounting dual wheels on single wheel vehicles, such as pickup trucks, dune buggies and the like.

Automotive vehicles, such as pickup trucks, dune buggies, and the like, are frequently driven over construction sites, fields, beaches, and other off-road areas where the surface may be inadequate to support the vehicle or may provide poor traction. When this occurs, the vehicle may become stuck and it may be necessary to employ a winch or tractor to extract the vehicle or, in mud, for example, to simply abandon the vehicle until the surface conditions improve. Obviously, such occurrences create considerable annoyance, and much time, effort and expense may be required to extract the vehicle. Moreover, for commercial operators, such as contractors and farmers, such occurrences may seriously interfere with the continuance of their activities.

PRIOR ART

It is well known that dual wheels improve the traction and load bearing characteristics of a vehicle. However, fortunately or unfortunately, such occurrences are not overly common and are often seasonal. Moreover, a large percentage of such vehicles are not subjected to off-road conditions and the provision of dual wheels would significantly increase the cost of such vehicles. Thus, it has been the practice, heretofore, to build such vehicles with single wheels and to rely upon special tires, accessories, such as chains, and techniques, such as partially deflating the tires, to prevent such vehicles from becoming stuck. In modification kits for dual wheels, poor load transfer characteristics have too often resulted.

BRIEF SUMMARY AND OBJECTS OF INVENTION

It will be apparent that the use of special tires, chains, and the like, would be of even greater value if used on dual wheels. Moreover, for pickup trucks and the like, dual wheels provide an additional advantage in increasing the load carrying ability of the vehicle. On the other hand, the provision of dual wheels significantly increases the tire cost and maintenance for the operator. Thus, it would be desirable to provide apparatus whereby dual wheels could be mounted, when needed, and could readily be dismounted, when they were not needed. Several devices have been proposed, previously, for accomplishing this. However, none of the prior art devices have been entirely satisfactory. Some of the prior art devices have been extremely difficult to mount and dismount. Others have required the use of special tools or equipment. Still other prior art devices have required substantial and expensive modification of the existing structure.

These disadvantages of the prior art are overcome with the present invention and a dual wheel attaching apparatus is provided which provides improved load transferring characteristics and can be quickly and easily mounted on or dismounted from existing structure without modification thereof, without requiring the use of special tools or equipment.

The advantages of the present invention are preferably attained by providing a dual wheel attaching apparatus comprising: a cylindrical member formed with radially projecting flanged portions at each end thereof; a plurality of apertures extending through the flanged portion at the inner end of said cylindrical member, said apertures being positioned to receive the wheel mounting studs of a vehicle; and a plurality of externally threaded shafts projecting outwardly from the flanged portion at the opposite outer end of said cylindrical member extending parallel to the axis of said cylindrical member and spaced to mate with the mounting apertures in a second vehicle wheel. Preferably, the externally threaded shafts are rotationally offset about the axis of said cylindrical member from the apertures in the flanged portion at the opposite end of the cylindrical member. A plurality of adjustable rim-engaging braces or arms are provided which extend from the interior of the cylindrical member, through the exterior wall of the cylindrical member to the rim of the inside wheel to attain improved load transfer characteristics. An adjustment mechanism is provided to securely fix the braces in load transferring disposition.

Accordingly, it is an object of the present invention to provide improved apparatus for mounting dual wheels.

Another object of the present invention is to provide apparatus for quickly and easily mounting and dismounting dual wheels.

A further object of the present invention is to provide apparatus for mounting and dismounting dual wheels without requiring the use of special tools or equipment.

Another paramount objective is the provision of an apparatus for converting a vehicle having a single set of rear wheels to one having dual wheels wherein load from each outside wheel is transferred by an adjustment mechanism to the rim of the adjacent inside wheel.

These and other objects and features of the present invention will be apparent from the following detailed description, taken with reference to the accompanying drawings.

DETAILED DESCRIPTION OF ILLUSTRATED EMBODIMENT

Figure 1:
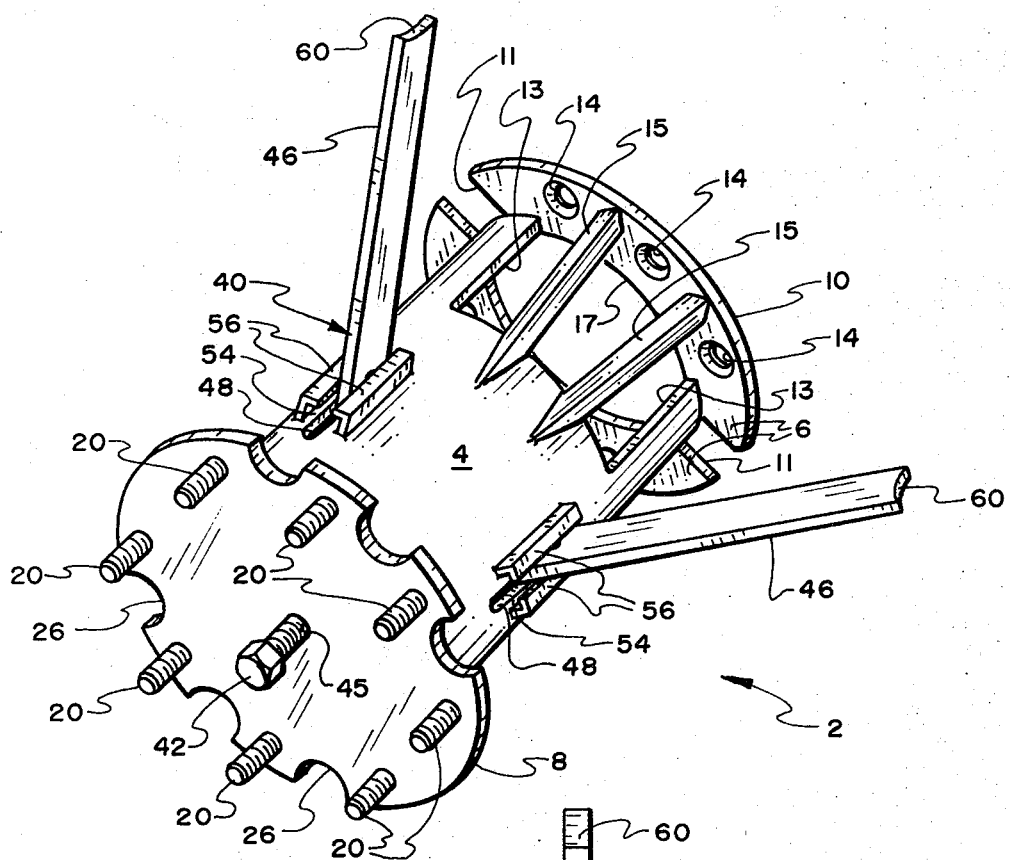
FIG. 1 is an isometric view of a dual wheel mounting device embodying the present invention.

In that form of the present invention chosen for purposes of illustration in FIGS. 1–4, a dual wheel mounting apparatus is shown, indicated generally at 2, comprising a generally cylindrical member 4 having outwardly radially projecting, flanged ends 6 and 8. As shown, the inner flanged end portion 6 is formed of two arc segments 10 spaced one from the other at notches 11, notches 11 being opposite each other about the periphery of the cylindrical member 4. Adjacent each arc segment 10 the cylindrical member 4 has been notched at 13 over a radially angular distance less than the radial angular distance traversed by the adjacent arc segment. Spaced elongated supports 15 bridge across the notch 13 from the exterior wall of the cylindrical member 4 to the body of the adjacent arc segment 10 and are secured in place, as, for example, by welding, so as to provide adequate structural support.

Each of the arc segments 10 has three apertures 14 extending therethrough dimensioned to receive the wheel mounting studs 16 of a vehicle hub 18. It will be understood that the number of arc segments 10 provided and the spacing thereof may be altered depending upon preference as well as the number and spacing of the wheel mounting studs 16 of the vehicle hub 18. The flange 6 defines a large axial opening 17, allowing access to the hub 18 through the opening 17 and notches 13.

Figure 2:
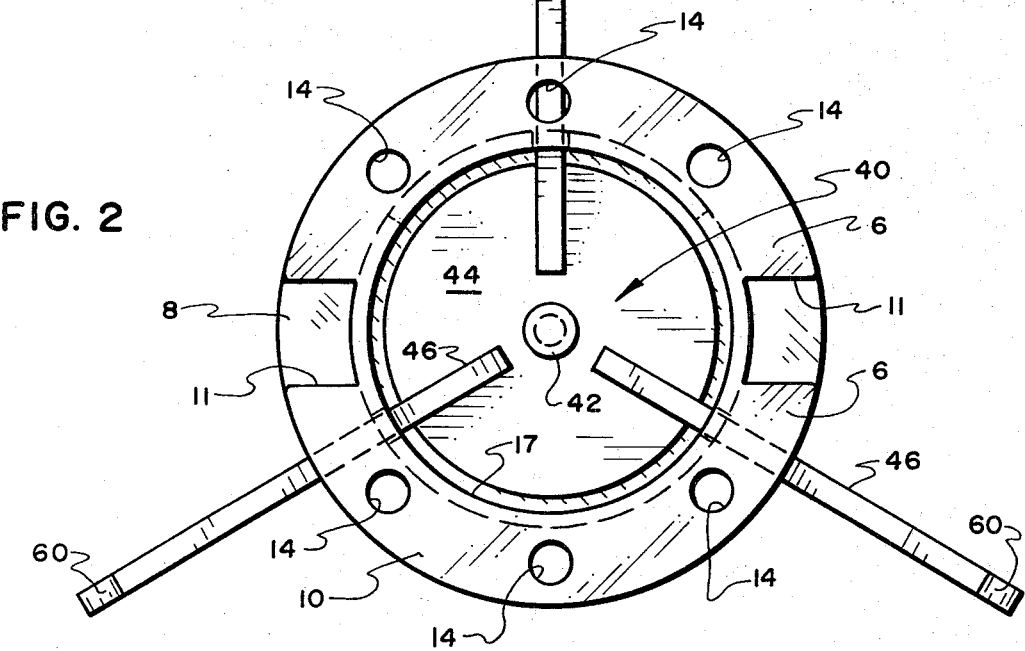
FIG. 2 is an isometric rear view of the device of FIG. 1.
Figure 3:
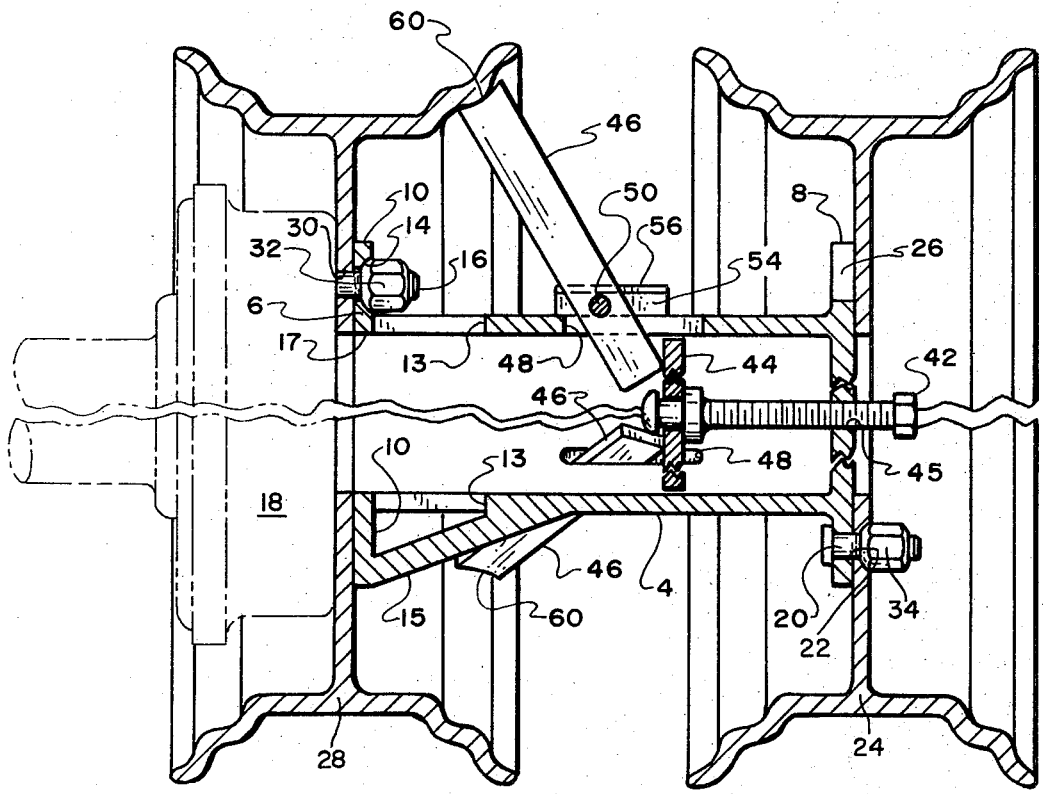
FIG. 3 is a view, partly in section, showing the device of FIG. 1 mounted on a vehicle.
Figure 4:
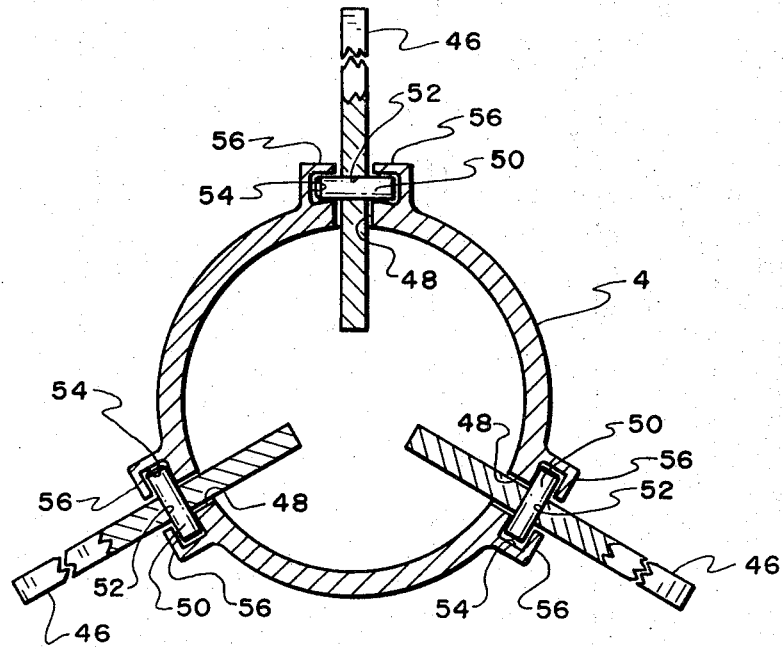
FIG. 4 is an end elevation of the assembly of FIG. 3.

At the opposite end of the cylindrical member 4, the outer flanged portion 8 has no access opening, but carries a plurality of externally threaded shafts 20 which are anchored to and project outwardly from the flanged portion 8 substantially parallel to the axis of the cylindrical member 4 and radially spaced equally thereabout to mate with the mounting apertures 22 of a vehicle wheel 24. Obviously, the number and spacing of the shafts 20 will be determined by the number and spacing of the mounting apertures 22 in the wheel 24 and will preferably, although not necessarily, be equal to the number of the apertures in the flanged portion 6 of the apparatus 2. As seen in FIGS. 2 and 4, the shafts 20 on flanged portion 8 are preferably rotationally offset about the axis of the cylindrical member 4 from the apertures 14 of the inner flanged portion 6 and recesses 26 are formed in the periphery of the flanged portion 8 in substantial alignment with the apertures 14 of flanged portion 6.

The present invention contemplates use of an adjustment mechanism, generally designated 40. The mechanism 40 comprises a bolt 42 threaded into the plate or flange 8 in an axial direction concentric with the axis of the plate 8 and the cylindrical member 4. The threaded bolt 42 is received into a threaded aperture 45 at said site such that clockwise rotation of the exposed head of the nut 42 advances the nut in respect to the plate 8 and counterclockwise rotation withdraws the nut from the plate 8. The distal end of the nut 42 is integrally secured against removal to a bearing plate 44, which is radially disposed within the cylindrical member 4. The bolt 42 is, however, rotatably connected to the plate 44 so that rotation of the threaded nut 42 does not necessarily rotate the plate 44.

The adjustment mechanism 40 also comprises a plurality of radially projecting, diagonally directed arms or braces 46. Each brace 46 passes through an elongated slot 48 in the wall of the cylindrical member 4. A pin 50 passes loosely through an aperture 52 eccentrically disposed along each arm 46. The shorter portion of the arm extends into the interior of the cylindrical member 4 and the longer portion radially and diagonally outward past the cylindrical wall. The pin 50 permits a limited amount of rotation of the associated arm and axial adjustment of the arm. This is accomplished by placing the pin slidably within a channel 54, formed by spaced angle irons secured along one leg to the exterior of the cylindrical member 4 adjacent one slot 48 such as the remaining leg of each of the angles 56 extends toward the other such that the gap between the last two mentioned legs is substantially less than the length of the pin 50 and the distance between the two legs respectively secured to the cylindrical member adjacent the slot 48 is slightly greater than the length of the pin permitting said sliding axial motion of the pin and associated arm in respect to the cylindrical member and allowing rotation of the associated arm about the pin.

By providing the adjustable or reorientable relationship between the arms 46 and the cylindrical member 4, the load of the outer wheel may be transferred by the cylindrical member, at least in part, to the rim of the inner wheel, the outer rim 60 of each arm 46 being contoured to effectively engage the rim of the inner wheel. The adjustment is simply obtained by appropriately rotating the nut 42 to displace the plate 44, which engages the inside free ends of each arm 46 until the arms 46 at their distal contoured end 60 engage the rim of the inner wheel in a snug and load-transferring way.

To mount dual wheels on the vehicle hub 18, using the apparatus 2, a first wheel 28 is mounted inserting the wheel mounting studs 16 of the vehicle hub 18 through the mounting apertures 30 of the first wheel 28, in a conventional manner. Next, the wheel mounting studs 16 of the vehicle hub 18 are inserted through the apertures 14 of the flanged portion 6 of the apparatus 2. Thereafter, wheel nuts 32 are threaded onto the studs 16, in a conventional manner, and are tightened to secure the first wheel 28 and the apparatus 2 to the vehicle hub 18. In order to accomplish this, a wrench may conveniently be passed through the recesses 26 in the flanged portion 8 of the apparatus 2. The outer wheel 24 is mounted by mating the shafts 20 of flanged portion 8 of the device with the mounting apertures 22 of the wheel 24 and wheel nuts 34 are threaded onto the shafts 20 and tightened to secure the wheel 24. If it is desired to remove the outer wheel 24 and the apparatus 2, for example, if the tire on the first wheel 28 should become flat, a wrench may be inserted through the openings 13 to loosen and remove the wheel nuts 32 from the wheel mounting studs 16 of the vehicle hub 18. Alternatively, if proper openings exist in the wheel 28, a tool may be extended through said wheel opening across recesses 26 to the nuts 32 for removal. Thereafter, in either case, the outer wheel 24 and the apparatus 2 may be removed, as a unit, to gain access to the inner wheel 28. Some relocation of the adjustment mechanism may be required. If desired, the wheel nuts 32 may then be rethreaded on the studs 16 to secure the inner wheel 28 and the vehicle may be driven as a single wheel vehicle.

Obviously, numerous other variations and modifications may be made without departing from the present invention. Accordingly, it should be clearly understood that the forms of the present invention described above and shown in the accompanying drawings are illustrative only and are not intended to limit the scope of the invention.

What is claimed is:

1. An apparatus for mounting dual wheels, said apparatus comprising:

a cylindrical member formed with radially projecting flanged portions at each end thereof;

a plurality of apertures extending through the flanged portion at one end of said cylindrical member and positioned to receive the wheel mounting studs of a vehicle hub to support a first vehicle wheel;

a plurality of externally threaded shafts projecting outwardly from the flanged portion at the opposite end of said cylindrical member extending parallel to the axis of said cylindrical member and positioned to mate with the mounting apertures of a second vehicle wheel; and an adjustable load-transferring mechanism comprising a plurality of arms extending from the cylindrical member, means mounting each arm to the cylindrical member for movement in respect thereto until the distal end of each arm engages the rim of the first vehicle wheel and means for releasably anchoring said arms in said rim-engaging position.

2. The apparatus of claim 1 wherein:
said shafts are rotationally offset from said apertures about the axis of said cylindrical member.

3. The apparatus of claim 2 further comprising:
a plurality of recesses formed in said flanged portion at the opposite end of said cylindrical member interposed between said shafts and generally aligned with said apertures.

4. The apparatus of claim 1 wherein said one flanged portion comprises:
a plurality of arc segments spaced about the periphery of said cylindrical members;
notches in the cylindrical member adjacent said arc segments for access to said vehicle hub; and
support structure bridging between the cylindrical member and each arc segment across the notches.

5. The apparatus of claim 1 wherein said mounting means of the adjustable mechanism comprises a pin eccentrically passing through each arm, the shorter length of arm in respect to the pin passing through an elongated slot in the cylindrical member and the longer length extending radially and diagonally outward away from the cylindrical member, each pin being confined in a channel, the channel and slot permitting axial displacement of the associated pin and arm and rotation of the arm about the pin and wherein said releasable anchoring means comprise a plate interior of the cylindrical member upon which the proximal end of each arm is adapted to engage and means for adjustably displacing the plate until the distal end of each arm firmly engages said wheel rim and for holding said plate once so displaced against inadvertent displacement.

* * * * *